(12) United States Patent
Tang et al.

(10) Patent No.: US 12,263,849 B2
(45) Date of Patent: Apr. 1, 2025

(54) DATA FUSION AND ANALYSIS ENGINE FOR VEHICLE SENSORS

(71) Applicants: NEC Laboratories America, Inc., Princeton, NJ (US); NEC Corporation, Tokyo (JP)

(72) Inventors: LuAn Tang, Pennington, NJ (US); Yuncong Chen, Plainsboro, NJ (US); Wei Cheng, Princeton Junction, NJ (US); Zhengzhang Chen, Princeton Junction, NJ (US); Haifeng Chen, West Windsor, NJ (US); Yuji Kobayashi, Tokyo (JP); Yuxiang Ren, Tallahassee, FL (US)

(73) Assignee: NEC Corporation, Tokyo (JP)

( * ) Notice: Subject to any disclaimer, the term of this patent is extended or adjusted under 35 U.S.C. 154(b) by 278 days.

(21) Appl. No.: 17/961,169

(22) Filed: Oct. 6, 2022

(65) Prior Publication Data
US 2023/0112441 A1 Apr. 13, 2023

Related U.S. Application Data

(60) Provisional application No. 63/253,164, filed on Oct. 7, 2021.

(51) Int. Cl.
*B60W 40/09* (2012.01)
*G06F 18/25* (2023.01)
*G06N 3/084* (2023.01)

(52) U.S. Cl.
CPC .......... *B60W 40/09* (2013.01); *G06F 18/25* (2023.01); *B60W 2420/403* (2013.01); *B60W 2540/30* (2013.01); *G06N 3/084* (2013.01)

(58) Field of Classification Search
CPC .......... B60W 40/09; B60W 2420/403; B60W 2540/30; B60W 50/0098; B60W 60/0011;
(Continued)

(56) References Cited

U.S. PATENT DOCUMENTS 9,821,813 B2 11/2017 Chandraker et al.
2017/0371329 A1* 12/2017 Giering .............. G05B 23/0294
(Continued)

FOREIGN PATENT DOCUMENTS

WO 2016100814 A1 6/2016

OTHER PUBLICATIONS

Alvin Wan et al., NBDT: Neural-Backed Decision Tree, arXiv:2004.00221v3 [cs.CV], pp. 1-19, Jan. 28, 2021 [retrieved on Jan. 31, 2023] from <https://arxiv.org/pdf/2004.00221.pdf> 1-20 pp. 3-4; and figures 1-2.

(Continued)

*Primary Examiner* — Rami Khatib
(74) *Attorney, Agent, or Firm* — Joseph Kolodka

(57) ABSTRACT

Systems and methods for data fusion and analysis of vehicle sensor data, including receiving a multiple modality input data stream from a plurality of different types of vehicle sensors, determining latent features by extracting modality-specific features from the input data stream, and aligning a distribution of the latent features of different modalities by feature-level data fusion. Classification probabilities can be determined for the latent features using a fused modality scene classifier. A tree-organized neural network can be trained to determine path probabilities and issue driving pattern judgments, with the tree-organized neural network including a soft tree model and a hard decision leaf. One or more driving pattern judgments can be issued based on a probability of possible driving patterns derived from the modality-specific features.

17 Claims, 10 Drawing Sheets

(58) Field of Classification Search
CPC .......... B60W 2050/0006; G06F 18/25; G06N
3/084; G06N 3/045; G06N 3/094; G06V
10/7747; G06V 10/806; G06V 20/56;
G06V 10/82
See application file for complete search history.

(56) References Cited

U.S. PATENT DOCUMENTS

| | | | |
|---|---|---|---|
| 2018/0217585 A1* | 8/2018 | Giering | G06V 10/454 |
| 2019/0130212 A1 | 5/2019 | Cheng et al. | |
| 2021/0232919 A1 | 7/2021 | Cheng et al. | |
| 2021/0241026 A1* | 8/2021 | Deng | G01S 7/497 |
| 2021/0350232 A1 | 11/2021 | Tang et al. | |
| 2021/0406560 A1* | 12/2021 | Park | G06T 7/70 |
| 2022/0076432 A1* | 3/2022 | Ramezani | G06N 3/044 |
| 2022/0309794 A1* | 9/2022 | Rykov | G06F 18/23 |
| 2022/0413507 A1* | 12/2022 | Li | G06V 20/58 |
| 2023/0008015 A1* | 1/2023 | Bodnariuc | G06V 10/25 |

OTHER PUBLICATIONS

Byeoungdo Kim et al., Probabilistic vehicle trajectory prediction over occupancy grid map via recurrent neural network, 2017 IEEE 20th International Conference on Intelligent Transportation Systems (ITSC), pp. 399-404, Oct. 16, 2017 Y [retrieved on Jan. 31, 2023] from <https://ieeexplore.ieee.org/abstract/document/8317943> 3-4,6-7,10-11, 13-14,17-18,20 pp. 402-403; and figure 6.

* cited by examiner

DATA FUSION AND ANALYSIS ENGINE FOR VEHICLE SENSORS

RELATED APPLICATION INFORMATION

This application claims priority to U.S. Provisional App. No. 63/253,164, filed on Oct. 7, 2021, incorporated herein by reference in its entirety.

BACKGROUND

Technical Field

The present invention relates to a data fusion and analysis engine for vehicle sensors, and more particularly to improved accuracy of real-time data analysis tasks for autonomous, semi-autonomous, and/or notification-assisted operation of a vehicle based on data fusion and analysis of a plurality of different types of data from vehicle sensors.

Description of the Related Art

Conventional autonomous, semi-autonomous, and/or notification-assisted vehicles utilize a plurality of cameras placed on different areas of a vehicle (e.g., front, rear, left, right, etc.) to attempt to collect relevant data for autonomous driving by constructing a full, 360-degree view of the surrounding area during operation of the vehicle. While conventional, camera based autonomous driving systems provide accurate depictions of the view captured by each of the cameras, it is often difficult or not possible to determine relevant features such as a distance of a particular object when using such systems. Further, such camera based autonomous driving systems generally function poorly in low-visibility conditions (e.g., night, fog, rain, snow, etc.), which can result in low accuracy of data analysis and/or poor performance of vehicle operation tasks (e.g., acceleration, braking, notification of obstacles, etc.).

SUMMARY

According to an aspect of the present invention, a method is provided for data fusion and analysis of vehicle sensor data, including receiving a multiple modality input data stream from a plurality of different types of vehicle sensors, determining latent features by extracting modality-specific features from the input data stream, and aligning a distribution of the latent features of different modalities by feature-level data fusion. Classification probabilities can be determined for the latent features using a fused modality scene classifier. A tree-organized neural network can be trained to determine path probabilities and issue driving pattern judgments, with the tree-organized neural network including a soft tree model and a hard decision leaf. One or more driving pattern judgments can be issued based on a probability of possible driving patterns derived from the modality-specific features.

According to another aspect of the present invention, a system is provided for data fusion and analysis of vehicle sensor data. The system can include one or more processors operatively coupled to a non-transitory computer-readable storage medium, the processors being configured for receiving a multiple modality input data stream from a plurality of different types of vehicle sensors, determining latent features by extracting modality-specific features from the input data stream, and aligning a distribution of the latent features of different modalities by feature-level data fusion. Classification probabilities can be determined for the latent features using a fused modality scene classifier. A tree-organized neural network can be trained to determine path probabilities and issue driving pattern judgments, with the tree-organized neural network including a soft tree model and a hard decision leaf. One or more driving pattern judgments can be issued based on a probability of possible driving patterns derived from the modality-specific features.

According to another aspect of the present invention, a non-transitory computer readable storage medium including contents that are configured to cause a computer to perform a method for data fusion and analysis of vehicle sensor data, including receiving a multiple modality input data stream from a plurality of different types of vehicle sensors, determining latent features by extracting modality-specific features from the input data stream, and aligning a distribution of the latent features of different modalities by feature-level data fusion. Classification probabilities can be determined for the latent features using a fused modality scene classifier. A tree-organized neural network can be trained to determine path probabilities and issue driving pattern judgments, with the tree-organized neural network including a soft tree model and a hard decision leaf. One or more driving pattern judgments can be issued based on a probability of possible driving patterns derived from the modality-specific features.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
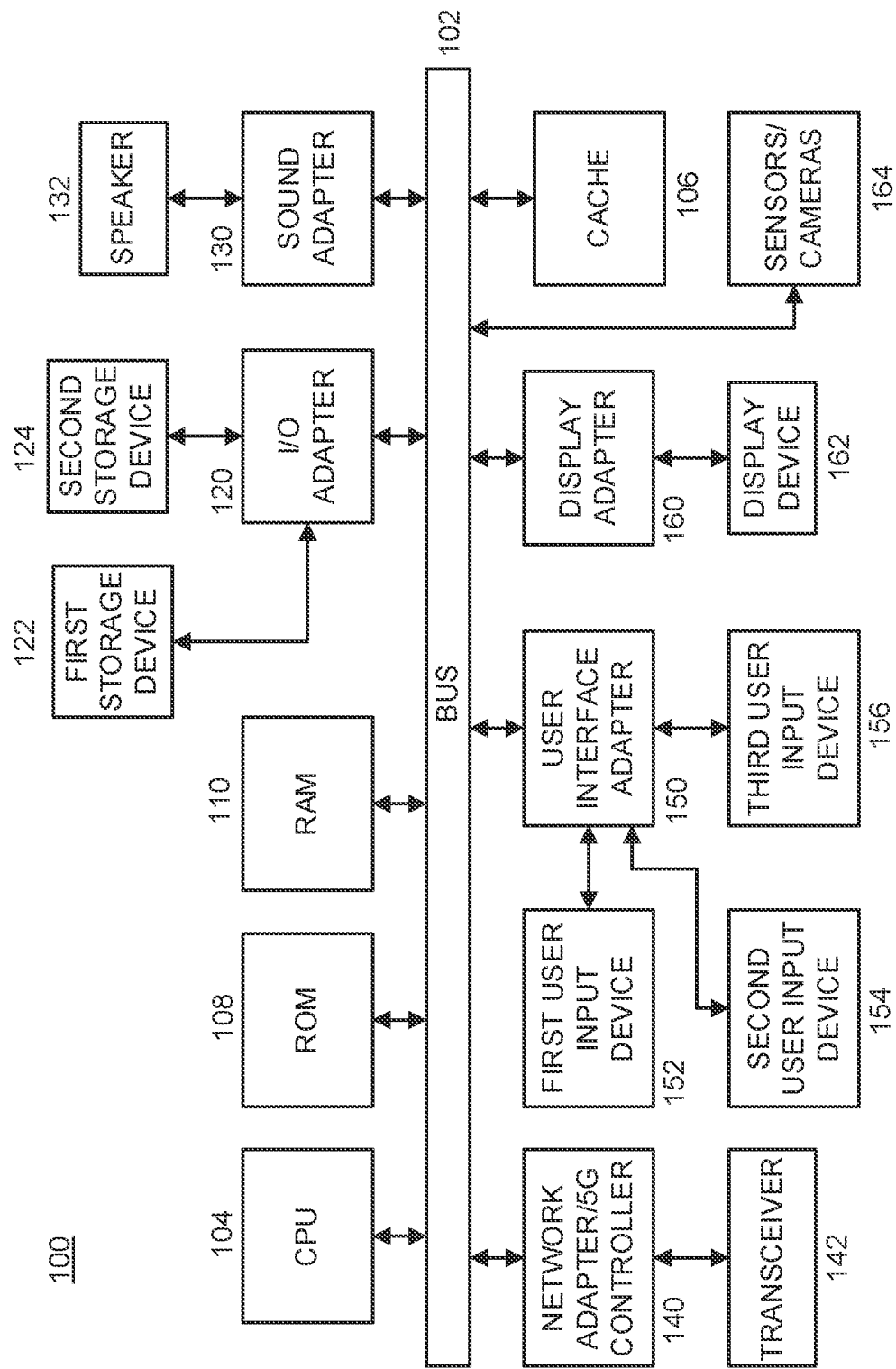
FIG. 1 is a block diagram illustratively depicting an exemplary processing system to which the present invention may be applied, in accordance with embodiments of the present invention.

In accordance with embodiments of the present invention, systems and methods are provided for autonomous, semi-autonomous, and/or notification-assisted operation of a vehicle, with improved accuracy of real-time data analysis and execution of vehicle-related tasks based on data fusion and analysis of a plurality of different types of data from vehicle sensors.

In various embodiments, a plurality of different types of sensors (e.g., cameras, Radar, proximity sensors, LIDAR, GPS, etc.) can be installed and utilized on a vehicle (e.g., automobile, aircraft, drone, boat, rocket ship, etc.) for autonomous, semi-autonomous, and/or notification-assisted operation of a vehicle, in accordance with aspects of the present invention. For ease of illustration, such vehicles capable of autonomous, semi-autonomous, and/or notification-assisted operation, in accordance with embodiments of the present invention are referred to as "autonomous vehicles" herein below.

In various embodiments, an autonomous vehicle with a plurality of different types of sensors can collect sensor data in multiple formats (e.g., "multi-modality"), and can integrate multiple data modalities (e.g., different types of data from different types of sensors) from each of the different sensors for fused analysis. For many data analysis tasks (e.g., failure detection, auto-driving assistant system's (ADAS) defect detection, ADAS video search, etc.), the accuracy is generally low, as conventional systems generally rely only on a single data modality.

The utilization of multi-modality data for controlling operation of an autonomous vehicle, in accordance with embodiments of the present invention, can increase accuracy of real-time data analysis tasks (e.g., data analysis of vehicle and/or external conditions for autonomous control of various functions of an autonomous vehicle). Further, increased accuracy and confidence for any of a plurality of autonomous tasks during operation of an autonomous vehicle by utilizing multi-modality data, in accordance with aspects of the present invention.

In various embodiments, as will be described in further detail herein below, the present invention can be utilized to solve a variety of problems that conventional autonomous driving systems fail to adequately address. For example, when utilizing multiple vehicle sensors to collect multi-modality data, raw sensor data can be dynamic and noisy, which can result in lowered accuracy for data analysis tasks. The present invention, can perform data fusion to generate comparatively high-quality features (e.g., cleaned data without noise) from the multi-modality sensor data, which can be utilized as input for further analysis, in accordance with aspects of the present invention. Further, it can be difficult to determine an analysis result by utilizing only a single modality, as in conventional systems, as a single modality generally includes limited scope and cannot provide sufficient data for accurate analysis and judgments for autonomous vehicle control tasks. The present invention can provide increased accuracy of such data analysis at least in part by integration data from multiple modalities from a plurality of different types of sensors for a complete and accurate view, in accordance with aspects of the present invention.

In some embodiments, as will be described in further detail herein below, a data fusion and analysis engine (DFAE) can be utilized for the above-discussed sensor data analysis for control of an autonomous vehicle. The DFAE can include two main components, including a feature level data fusion component and a semantic level fusion component. The feature level data fusion can be performed prior to any main data analysis tasks (e.g., semantic-level fusion, driving pattern analysis and classification, tree-organized neural network generation and utilization, DFAE learning, adversarial attention fusing, etc.), and thus can filter out the noises and generate high quality features for further analysis to prevent inaccurate results from lower quality features being analyzed, as in conventional systems. The semantic level fusion can be performed after any main analysis tasks to further refine the analysis results and boost the output accuracy, in accordance with aspects of the present invention.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Aspects of the present invention are described below with reference to flowchart illustrations and/or block diagrams of methods, systems and computer program products according to embodiments of the present invention. It is noted that each block of the flowcharts and/or block diagrams, and combinations of blocks in the flowcharts and/or block diagrams, may be implemented by computer program instructions.

The flowchart and block diagrams in the figures illustrate the architecture, functionality, and operation of possible implementations of systems, methods and computer program products according to various embodiments of the present invention. Each block in the flowchart or block diagrams may represent a module, segment, or portion of code, which comprises one or more executable instructions for implementing the specified logical function(s), and in some alternative implementations of the present invention, the functions noted in the block may occur out of the order noted in the figures. For example, two blocks shown in succession may, in fact, be executed substantially concurrently, may sometimes be executed in reverse order, or may be executed in any other order, depending on the functionality of a particular embodiment.

It is also noted that each block of the block diagrams and/or flowchart illustration, and combinations of blocks in the block diagrams and/or flowchart illustration, can be implemented by specific purpose hardware systems that perform the specific functions/acts, or combinations of special purpose hardware and computer instructions according to the present principles.

Referring now to the drawings in which like numerals represent the same or similar elements and initially to FIG. 1, an exemplary processing system 100, to which the present principles may be applied, is illustratively depicted in accordance with embodiments of the present principles.

In some embodiments, the processing system 100 can include at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid-state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160. One or more sensors 164 (e.g., cameras, proximity sensors, LIDAR data, GPS data, time-series signal detectors, etc.) can be further coupled to system bus 102 by any appropriate connection system or method (e.g., Wi-Fi, wired, network adapter, etc.), in accordance with aspects of the present invention.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 300, 400, 500, 600, 900, and 1000, described below with respect to FIGS. 3, 4, 5, 6, 9, and 10, respectively, are systems for implementing respective embodiments of the present invention. Part or all of processing system 100 may be implemented in one or more of the elements of systems 300, 400, 500, 600, 900, and 1000, in accordance with aspects of the present invention.

Further, it is to be appreciated that processing system 100 may perform at least part of the methods described herein including, for example, at least part of methods 200, 300, 400, 500, 600, 700, and 800, described below with respect to FIGS. 2, 3, 4, 5, 6, 7, and 8, respectively. Similarly, part or all of systems 300, 400, 500, 600, 900, and 1000 may be used to perform at least part of methods 200, 300, 400, 500, 600, 700, and 800 of FIGS. 2, 3, 4, 5, 6, 7, and 8, respectively, in accordance with aspects of the present invention.

As employed herein, the term "hardware processor subsystem", "processor", or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 2:
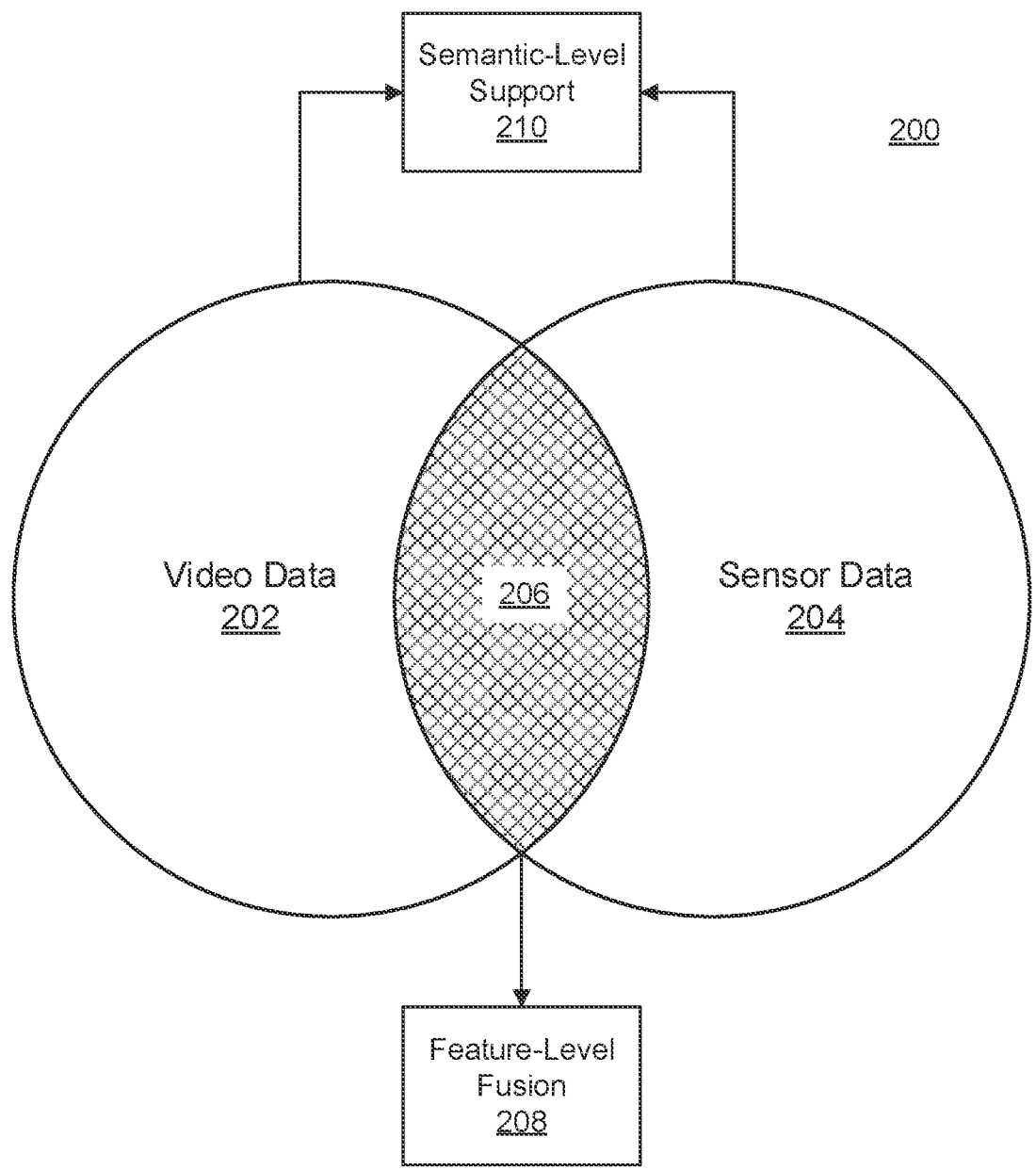
FIG. 2 is a Venn diagram illustratively depicting a high-level view of a method for data fusion and analysis of a plurality of different types of data from vehicle sensors, in accordance with embodiments of the present invention.

Referring now to FIG. 2, a Venn diagram 200 illustratively depicting a high-level view of a method for data fusion and analysis of a plurality of different types of data from vehicle sensors is illustratively depicted in accordance with embodiments of the present invention.

In an illustrative embodiment, video data 202 and other sensor data 204 can be fused to form an overlapped area 206 of the video data 202 and other sensor data 204. The overlapped area 206 can include common information from the video data 206 and other sensor data 204 shared by different modalities, and can be utilized to remove the noises present in a single modality to provide improved, high-quality input for further analysis using a Data Fusion and Analysis Engine (DFAE) for vehicle sensors (e.g., autonomous vehicle sensors). The non-overlapped areas (e.g., video data 202, sensor data 204) can include, for example, information which describes differentiated information that provides auxiliary information (e.g., GPS sensor data, CAN Bus sensor data, etc.), which can be utilized in future analysis tasks, in accordance with aspects of the present invention.

In some embodiments, the input video data 202 and sensor data 204 can be any of a plurality of data types/formats (e.g., video, LIDAR data, time series signals, etc.) from any of a plurality of respective vehicle sensors, which can be utilized for feature level data fusion 208 and/or semantic level support 210, in accordance with aspects of the present invention. The feature level data fusion 208 can remove noises of input data, and thus can generate comparatively high-quality features (e.g., latent features) for analysis tasks, in accordance with aspects of the present invention.

The feature level data fusion 208 can be performed prior to any main data analysis tasks (e.g., semantic-level fusion, driving pattern analysis and classification, tree-organized neural network generation and utilization, DFAE learning, adversarial attention fusing, etc.), and thus can filter out the noises and generate comparatively high quality features (e.g., fused feature) for further analysis to prevent inaccurate results from lower quality features (e.g., latent features) being analyzed, as in conventional systems. The semantic level support 210 can be performed after any main analysis tasks to further refine the analysis results and boost the output accuracy by utilizing the information from multiple data modalities, in accordance with aspects of the present invention.

Figure 3:
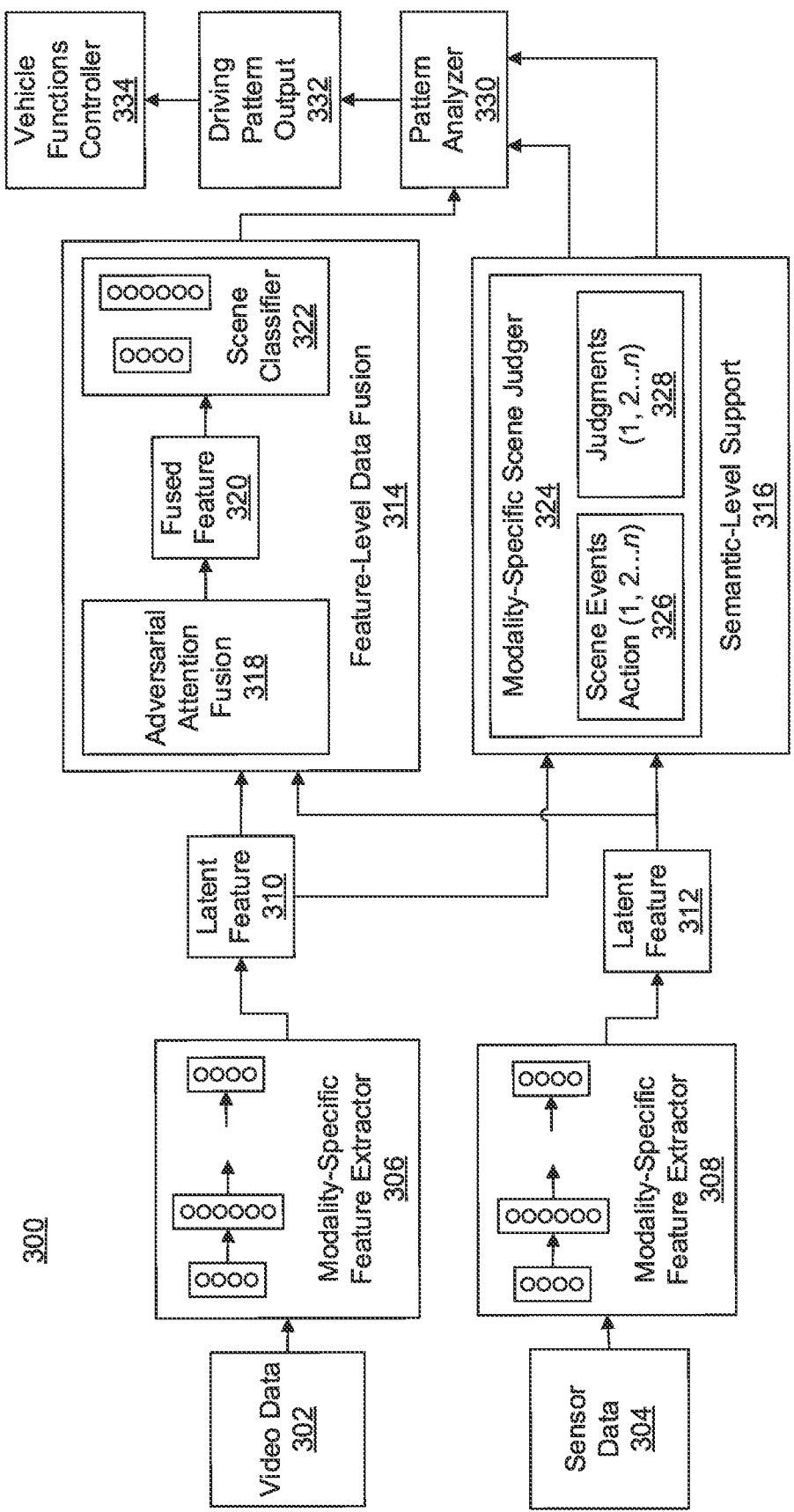
FIG. 3 is a block/flow diagram illustratively depicting a high-level system and method for data fusion and analysis of a plurality of different types of data from vehicle sensors for autonomous, semi-autonomous, and/or notification-assisted operation of a vehicle, in accordance with embodiments of the present invention.

Referring now to FIG. 3, a high-level system and method 300 showing a data fusion and analysis engine for a plurality of different types of data from vehicle sensors for autonomous, semi-autonomous, and/or notification-assisted operation of a vehicle is illustratively depicted in accordance with embodiments of the present invention.

In one embodiment, a data fusion and analysis engine (DFAE) 300 for vehicle sensors can include a feature level data fusion module 314 and a semantic-level support module 316, which can generate comparatively high-quality input features and refine output for data analysis tasks for vehicle-related data, respectively, in accordance with aspects of the present invention. The DFAE 300 can be utilized as a generalized framework, and as such, does not need to change any code for main data analysis tasks (e.g., Advanced Driver Assistance Systems (ADAS) video search, ADAS defect detection, car fault detection, road hazard detection), and can be applied directly to such main data analysis tasks, in contrast to conventional systems. Further, by integrating and fusing data of multiple modalities, accuracy of data analysis tasks can be significantly improved in comparison to conventional systems, in accordance with aspects of the present invention.

In an illustrative embodiment, a task of driving pattern analysis for improved autonomous vehicle navigation is described, but it is to be appreciated that the present principles can be applied for any of a plurality of other vehicle-related tasks (e.g., navigation, acceleration, braking, weather condition response, etc.), in accordance with various embodiments of the present invention.

In some embodiments, a plurality of different types of input data can be received and/or analyzed, including, for example, video data 302 and other sensor data 304 received from any of a plurality of sensors (e.g., cameras, Radar, proximity sensors, LIDAR, GPS, Controller Area Network (CAN) bus etc.) deployed on a vehicle, in accordance with aspects of the present invention. One or more modality specific feature extractors 306, 308 can process the received video data 302 and other sensor data 304, respectively, to extract latent features 310, 312, respectively, for further processing by feature level data fusion 314 and/or semantic level support 316, in accordance with aspects of the present invention.

In various embodiments, the feature level data fusion 314 can align latent feature distribution of different modalities by utilizing adversarial learning and attention 318 to generate a fused feature 320. The adversarial learning and attention fusion 318 can utilize an adversarial regularizer to align the latent feature distribution of distinct modalities. The fused feature 320 can be utilized by a fused modality scene classifier 322 to determine classification probabilities in accordance with aspects of the present invention, which will be described in further detail herein below with reference to FIG. 4.

Modality invariance in a latent space can be achieved more efficiently utilizing an adversarial process such as adversarial attention fusion 318 at least in part because improved alignment of modality distributions aids subsequent fusion, particularly when fused features 320 are calculated using a weighted average of latent features. Furthermore, the present invention can implement an attention layer that adaptively allocates the weight for each modality to measure the value of distinct modalities to further improve accuracy of the feature level data fusion 314, in accordance with aspects of the present invention.

In some embodiments, semantic-level support 316 can determine and utilize the differences of each modality to provide support for driving patterns classification using a modality specific scene judger 324. The modality specific scene judger 324 can receive and/or analyze scene action events 326 (e.g., cut-in, cut-through, wrong way, obstacle, etc.) as input, and can issue judgments 328, which can include determining and outputting a probability of possible driving patterns, as shown in Table 1, below:

TABLE 1

| SCENE | JUDGMENT |
|---|---|
| Cut-in | 0.65 |
| Cut-through | 0.22 |
| ... | ... |
| Wrong-way | Not Possible |
| Obstacle | Not Possible |

In some embodiments a tree-organized neural network can be utilized for the judgments 328, and can be utilized, for example, to determine impossible driving pattern judgments (e.g., shown in Table 1), which can be input and utilized by the pattern analyzer 330 to further increase accuracy of a determined driving pattern output 332. The determined driving pattern output 332 can be utilized for improved vehicle operation by a vehicle function controller 334 (e.g., accelerator, brake, lighting, air conditioning, etc.). In some embodiments, the pattern analyzer 330 can consider the judgements from the feature-level data fusion from the scene classifier 322 and the semantic-level support 316 simultaneously in real-time to accurately determine the driving pattern using the pattern analyzer 330 for vehicle operation by the vehicle controller 334, in accordance with aspects of the present invention.

In some embodiments, for the output results 332 if the pattern analyzer 330, the possibilities from the feature-level fusion 314 and the semantic level support 316 sum up first in the pattern analyzer 330, and judged impossible driving patterns can be ruled out. A softmax layer can be applied on the rest of the sum-up possibilities, and the highest possibility can be outputted as the final judged driving pattern in block 332, in accordance with aspects of the present invention.

It is to be appreciated that although the system and method 300 is described herein below as being directed to autonomous vehicle control, the present principles can be applied to other cyber physical systems (e.g., smart city (camera, video, temperature sensor, etc.), smart house, etc.), in accordance with aspects of the present invention.

Figure 4:
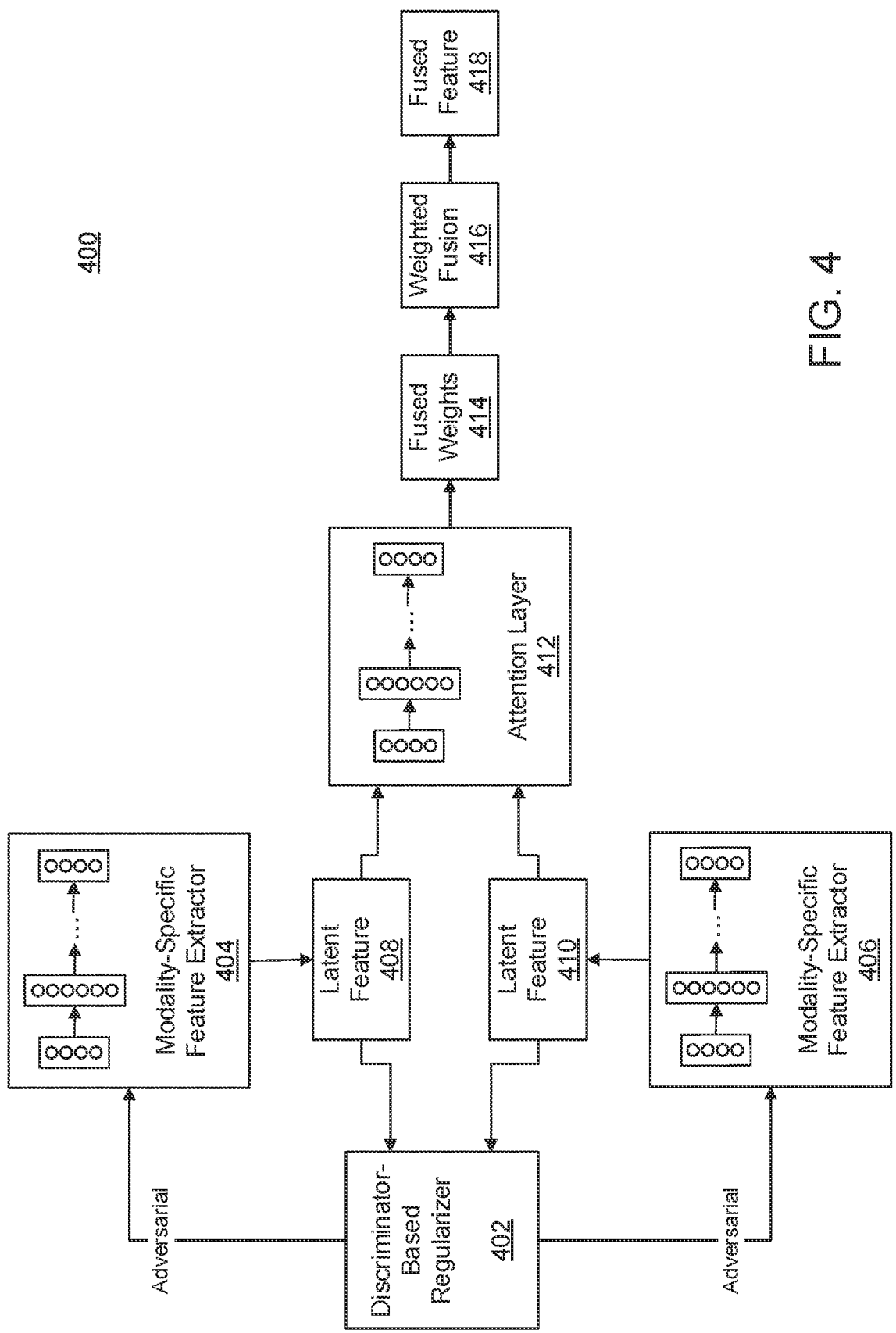
FIG. 4 is a block/flow diagram illustratively depicting a system and method for feature level data fusion of a plurality of different types of data from vehicle sensors for autonomous, semi-autonomous, and/or notification-assisted operation of a vehicle, in accordance with embodiments of the present invention.

Referring now to FIG. 4, a system and method 400 for feature level data fusion of a plurality of different types of data from vehicle sensors for autonomous, semi-autonomous, and/or notification-assisted operation of a vehicle is illustratively depicted in accordance with embodiments of the present invention.

In accordance with various embodiments, feature level fusion 400 can include aligning received feature distributions and assigning a discriminator-based regularizer 402 in pairwise fashion. It can then be determined whether the real data and fake data belong to the same distribution. Adversarial learning can be utilized to reach modality invariance in the latent space and to quantify the importance of various modalities. The attention layer is utilized for learning fusion weights, in accordance with aspects of the present invention, as will be described in further detail herein below.

Multiple statistical features of multi-modal data have shown that fusing different modalities in the data space is difficult to accurately perform in practice. In various embodiments, such fusing of different modalities in the data space can be performed by creating and/or utilizing one or more modality-specific feature extractors 404, 406 to convert the data into low-dimensional latent space to generate one or more latent features 408, 410. A major duty of feature learning is carried out by the feature extractors 408, 410, and it also has the goal of confusing the discriminator 402, in accordance with aspects of the present invention. As an example, for the $v^{th}$ modality, the corresponding latent feature 408, 410 can be encoded as follows:

$$K_{ij}^v = \exp(-\|h_i^v - h_j^v\|_2 / 2\sigma^2)$$

where $E_v(\cdot)$ refers to the modality's encoder parameterized by $\theta_e^v$. Then, based on $H^v$, a data metric (e.g., Gaussian metric) can be estimated of data in latent space 408, 410. Formally, it can be determined as follows:

$$K_{ij}^v = \exp(-\|h_i^v - h_j^v\|_2 / 2\sigma^2)$$

where $h_i^v$ denotes the $i^{th}$ column of $H^v$ (e.g., $i^{th}$ sample) and σ represents the bandwidth. In some embodiments, encoder networks can be constrained with, for example, random Independent and Identical Distribution (IID) Gaussian weights to avoid degenerated metric structure of data. The metric structure of data can be preserved by a DNN with random IID Gaussian weights when the intrinsic dimensionality of the data is proportional to the network width.

In various embodiments, a modality fusion module can combine data from various modalities to provide a comprehensive estimate, and can include the discriminator-based regularizer 402 and the modality-awareness attention layer 412, in accordance with aspects of the present invention.

In some embodiments, a discriminator-based regularizer 402 can align the latent feature distributions of any or a plurality of modalities, and can include, for example, of V−1 discriminators, each of which can be three fully connected layers. For example, taking the first modality as a key modality, a discriminator-based regularizer 402 can be assigned between the first modality and one of the other modalities in pairwise fashion. For each latent feature 408, 410 $H^v(v=2,3,\ldots,V)$ drawn from the distribution $p_v$, the discriminator-based regularizer 402 $p_v$, parameterized by $\theta_d^v$ can determine whether its real data $h_i^1 \in H^1$ and fake data $\widetilde{h_i^v} \in H^v$ belong to the same distribution. In this process, the discriminator-based regularizer $D_v$ can be optimized in an alternating manner with an encoder network $E_V$ to solve adversarial min-max problem. In this way, the discriminator-based regularizer 402 can guide encoder networks to learn the same latent feature 408, 410 distribution, in accordance with aspects of the present invention. Note that considering all possible combinations (e.g., up to $2^V$) can dramatically increase the burden of network training.

In various embodiments, a modality-awareness attention layer 412 can learn the weights for different modalities, the input of which can be concatenated features h (e.g., concatenated latent features 408, 410) and the output of which can be a V dimensional vector w. In various embodiments, fused weights can be output in block 414, weighted fusion can be performed in block 416, and a fused feature can be output in block 418, in accordance with aspects of the present invention.

The attention layer 412 can include, for example, three fully connected layers and a softmax layer, functions of which can be represented as follows:

$$h = [h^1, h^2, \ldots, h^v] \quad (1)$$

$$act = FCs(h) \quad (2)$$

$$e = \text{Softmax}(\text{sigmoid}(act)/\tau) \quad (3)$$

$$w = \text{Mean}(e, dim=0) \quad (4)$$

where [·] denotes a concatenation operator, FCs(·) represents 3 fully connected layers, and $\tau$ represents a calibration factor. The sigmoid function together with the calibration factor can be utilized to avoid assigning close-to-one score to the most related modality. Note that for illustrative purposes, the parameters in this module are denoted as $\theta_a$. At this time, the fused representations 418 of a sample can be determined as follows:

$$h_f = \sum_v w_v h^v$$

Then, $h_f$ can be fed into a fused modality scene classifier, which can include two fully connected layers and a softmax layer, to determine the classification probabilities, in accordance with aspects of the present invention, and will described in further detail herein below with reference to FIGS. 5 and 6.

Figure 5:
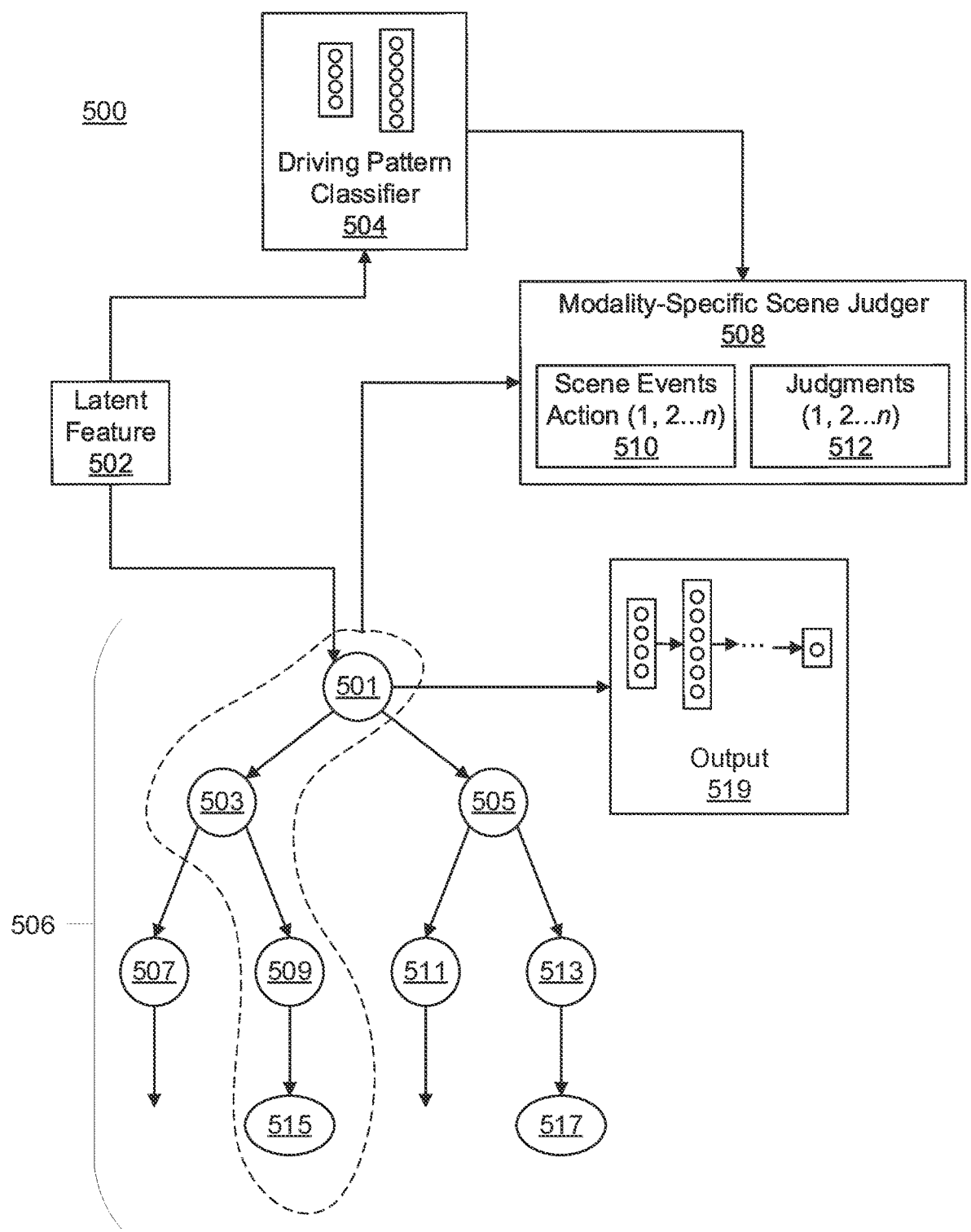
FIG. 5 is a block/flow diagram illustratively depicting a system and method for semantic level classifying and analyzing of driving patterns using a modality specific driving pattern classifier and a tree-based neural network for autonomous, semi-autonomous, and/or notification-assisted operation of a vehicle, in accordance with embodiments of the present invention.

Referring now to FIG. 5, a system and method 500 for semantic level classifying and analyzing of driving patterns using a modality specific driving pattern classifier and a tree-based neural network for autonomous, semi-autonomous, and/or notification-assisted operation of a vehicle is illustratively depicted in accordance with embodiments of the present invention.

In various embodiments, an input data stream from one or more sensors (e.g., video cameras, proximity sensors, infrared sensors, microphones, velocity sensors, etc.) can be monitored and data can be received as one or more latent features in block 502. N As the feature-level data fusion, described with reference to FIG. 4, can essentially completely eliminate the differences of different modalities, the semantic level classifying and analyzing of FIG. 5 can makes full use of the differences of each modality to determine driving mode classifications for a plurality of features, in accordance with aspects of the present invention.

In some embodiments, two main components can be utilized for the semantic level support system and method 500. The components can include a modality specific driving pattern classifier 504, which can determine and output a probability of one or more possible driving patterns. Another component can be a tree-organized neural network 506, which can determine and output a path probability in block 519, and the output can be utilized by a modality specific scene judger 508 for driving pattern judgments (e.g., impossible driving pattern judgment). Some driving patterns are not easy to be confirmed, but easy to be determined and impossible to appear. For example, the data of an autonomous vehicle (e.g., ego car) can confirm the possibility of the other vehicle's wrong way driving (e.g., the ego car is not slowing down at all).

In some embodiments, semantic-level support can determine and utilize the differences of each of a plurality of modalities for determining driving patterns classification using a modality specific scene judger 508. A modality specific scene judger 508 can receive and/or analyze scene action events 510 (e.g., cut-in, cut-through, wrong way, obstacle, etc.) as input, and can issue judgments 512, which can include determining and outputting a probability of possible driving patterns, as shown in Table 2, below:

TABLE 2

| SCENE | JUDGMENT |
|---|---|
| Cut-in | 0.65 |
| Cut-through | 0.22 |
| . . . | . . . |
| Wrong-way | Not Possible |
| Obstacle | Not Possible |

In various embodiments, a modality specific driving pattern classifier 504 can include 3 fully connected layer and a softmax layer, and the input can be the latent feature 502 $H^v (v=1,2,3, \ldots, V)$. A function of the modality specific driving pattern classifier can be to output a classification probability of each driving pattern based on the latent feature 502 of each modality, respectively, which can be analogous to driving pattern understanding based on unfused features.

In some embodiments a tree-organized neural network 506 can be utilized for the judgments 512, which can include, for example, determining impossible driving pattern judgments (e.g., shown in Table 2). A tree structure can be utilized to organize multiple neural networks in a hierarchical way. In some embodiments, the tree-organized neural network 506 can include a soft tree model and hard decision leaf. The system can take a latent feature 502 $h_i^1$ as an input example, which can be received from a trained modality-specific feature extractor. The latent feature 502 $h_i^1$ can traverse each leaf node 501, 503, 505, 507, 511, 513, 515, 517 and determine the path probabilities, in accordance with various aspects of the present invention.

Figure 6:
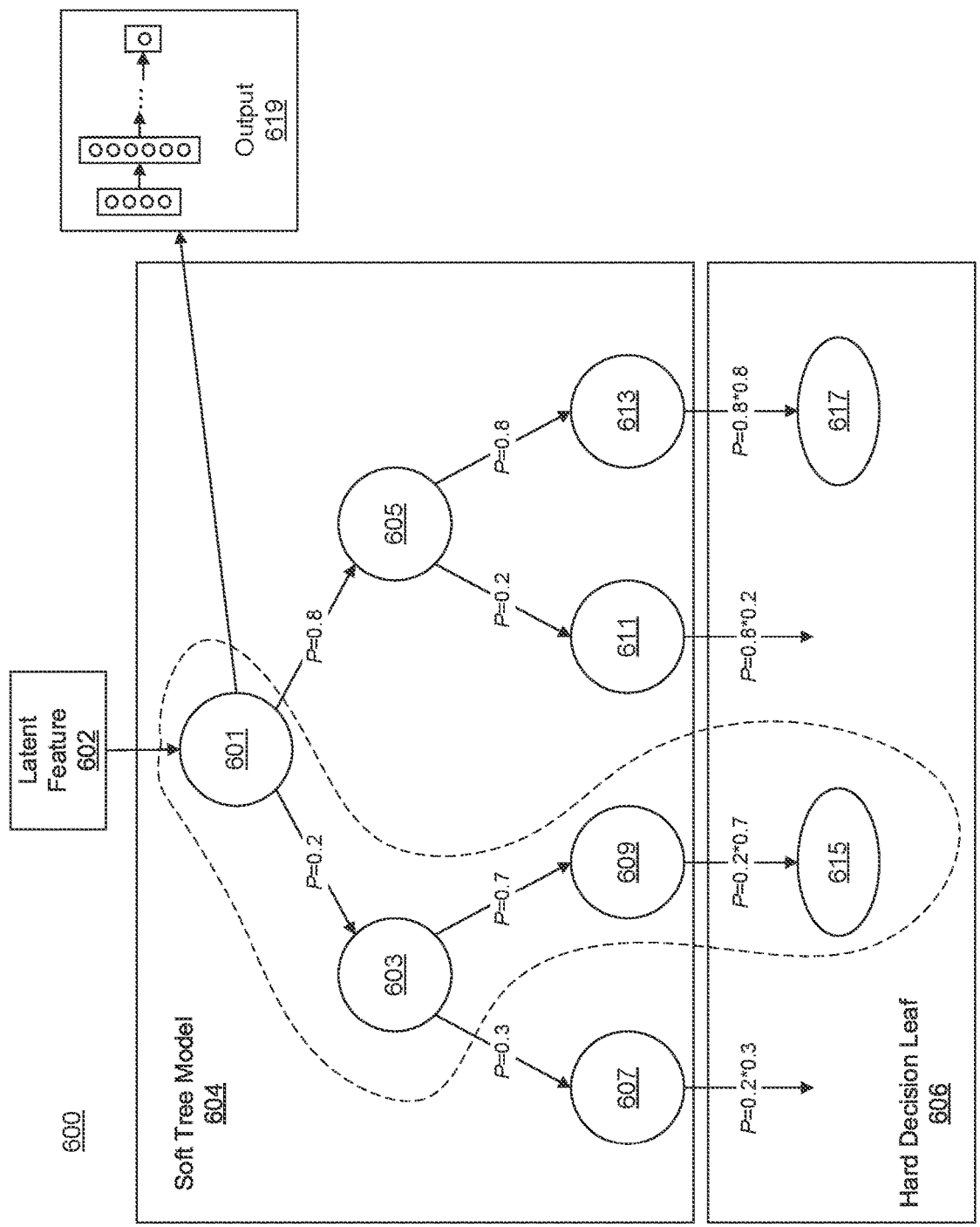
FIG. 6 is a block/flow diagram illustratively depicting a system and method for generating, training, and utilizing a tree-based neural network for semantic level classifying and analyzing of driving patterns for autonomous, semi-autonomous, and/or notification-assisted operation of a vehicle, in accordance with embodiments of the present invention.

Referring now to FIG. 6, a system and method 600 for generating, training, and utilizing a tree-based neural network for semantic level classifying and analyzing of driving patterns for autonomous, semi-autonomous, and/or notification-assisted operation of a vehicle is illustratively depicted in accordance with embodiments of the present invention.

In various embodiments, a tree structure can be utilized to organize multiple neural networks in a hierarchical way. In some embodiments, a tree-organized neural network can include a soft tree model 604 and a hard decision leaf 606. The system can take a latent feature 602 $h_i^1$ as an input example, which can be received from a trained modality-specific feature extractor. The latent feature 602 $h_i^1$ can traverse each leaf node 601, 603, 605, 607, 611, 613, 615, 617 and determine the path probabilities, in accordance with various aspects of the present invention.

In various embodiments, the upper component of the tree-organized neural network can be a soft tree model 604. Each node 601, 603, 605, 607, 609, 611, 613 in the soft tree model 604 can be a neural network. The structure of the neural network can be the same for each node 601, 603, 605, 607, 609, 611, 613, and can include 2 fully connected layers and a softmax layer for binary classification. These nodes can be denoted as $N_k^j$, where j represents the level of the node. For example, $N_1^1$ represents the first node in the first level, and it can also be the root node. The leaves in the soft tree model can correspond to each driving pattern (e.g., cut in, cut out, cut through, etc.) in accordance with aspects of the present invention.

In various embodiments, the tree-organized neural network of the present invention can function essentially equivalently to performing top-down hierarchical clustering of the latent feature 602 $h_i^1$. The neural network $N_k^j$ in the hierarchical clustering can be equivalent to a filtering for impossible patterns. After multiple layers of filtering, the confidence of impossible scenes can be further suppressed, and a final output probability 619 of the soft tree model can be the path probability. In this way, the loss of internal nodes can be effectively minimized, in accordance with aspects of the present invention. For example, the path probability outputted by the first leave node can be $P_1^f$, and can be represented as follows:

$$p_1^f = \prod_{j=1}^{J} N_1^j(h_i^1)$$

where J represents a total number of levels of the tree structure.

In various embodiments, a hard decision leaf 606 can be utilized and can include nodes 615 and 617. To achieve the hard decisions, a softmax layer can be utilized as an activation layer, which can result in a trade-off situation. That is, as more impossible driving patterns are provided, more semantic level support can be supplied, but there also can be a higher possibility of providing false positive decisions for the final results. The trade-off can be considered through the setting of a threshold T and can be utilized for judging driving patterns. For example, a driving pattern with $\sigma(p^f)=0$ can be judged as an impossible driving pattern as follows:

$$\sigma(p^f) = \begin{cases} p^f, & x >= T \\ 0, & x < T \end{cases}$$

Prior to training, a tree structure can be created, and data from the training set can be utilized to obtain latent features, in accordance with aspects of the present invention. The creation of a tree structure will be described in further detail herein below with reference to FIG. 7.

Figure 7:
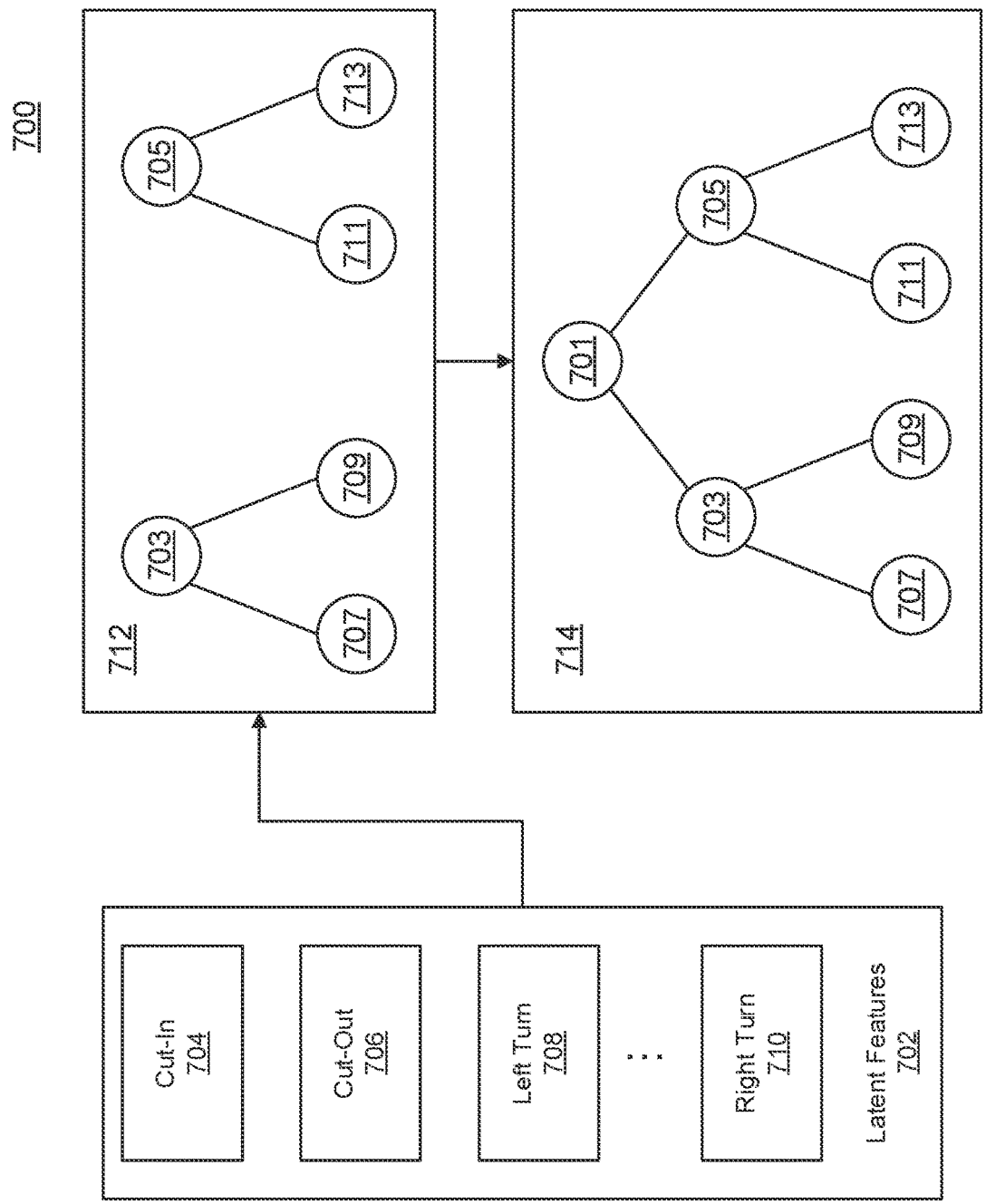
FIG. 7 is a block/flow diagram illustratively depicting an exemplary high-level method for constructing a tree-based neural network for semantic level classifying and analyzing of driving patterns for autonomous, semi-autonomous, and/or notification-assisted operation of a vehicle, in accordance with embodiments of the present invention.

Referring now to FIG. 7, an exemplary high-level method 700 for constructing a tree-based neural network for semantic level classifying and analyzing of driving patterns for autonomous, semi-autonomous, and/or notification-assisted operation of a vehicle is illustratively depicted in accordance with embodiments of the present invention.

In one embodiment, prior to training, a tree structure 714 can be created, and can utilize data from a training set of latent features 702 to obtain labeled latent features (e.g., cut-in 704, cut-out 706, left turn 708, right turn 710, etc.), which can correspond to a cut-in node 707, a cut-out node 709, a left turn node 711, and a right turn node 713, respectively. In an embodiment including a dataset d with two latent features $h_i^1$ and $h_j^v$, a similarity between them can be measured by the inner product after normalization as follows:

$$d(h_i^v, h_j^v) = \text{Normalized}[h_i^v] \cdot \text{Normalized}[h_j^v]$$

Based on the average latent feature similarity between known different driving patterns, a similar driving pattern pair can be selected to build the tree leaves. Then, an average feature similarity between subtrees can be calculated, and the higher leaves 703, 705 can be built until the root node 701 is reached using a bottom-up construction, in accordance with aspects of the present invention. In the illustrative example of FIG. 7, the tree is shown to be built in a bottom-up way, in which left turn 711 and right turn 713 can constitute a subtree first, and then a higher level can be built with the subtree including cut-in 707 and cut out 709, but it is to be appreciated that any features and number of levels can be utilized in accordance with various aspects of the present invention.

Figure 8:
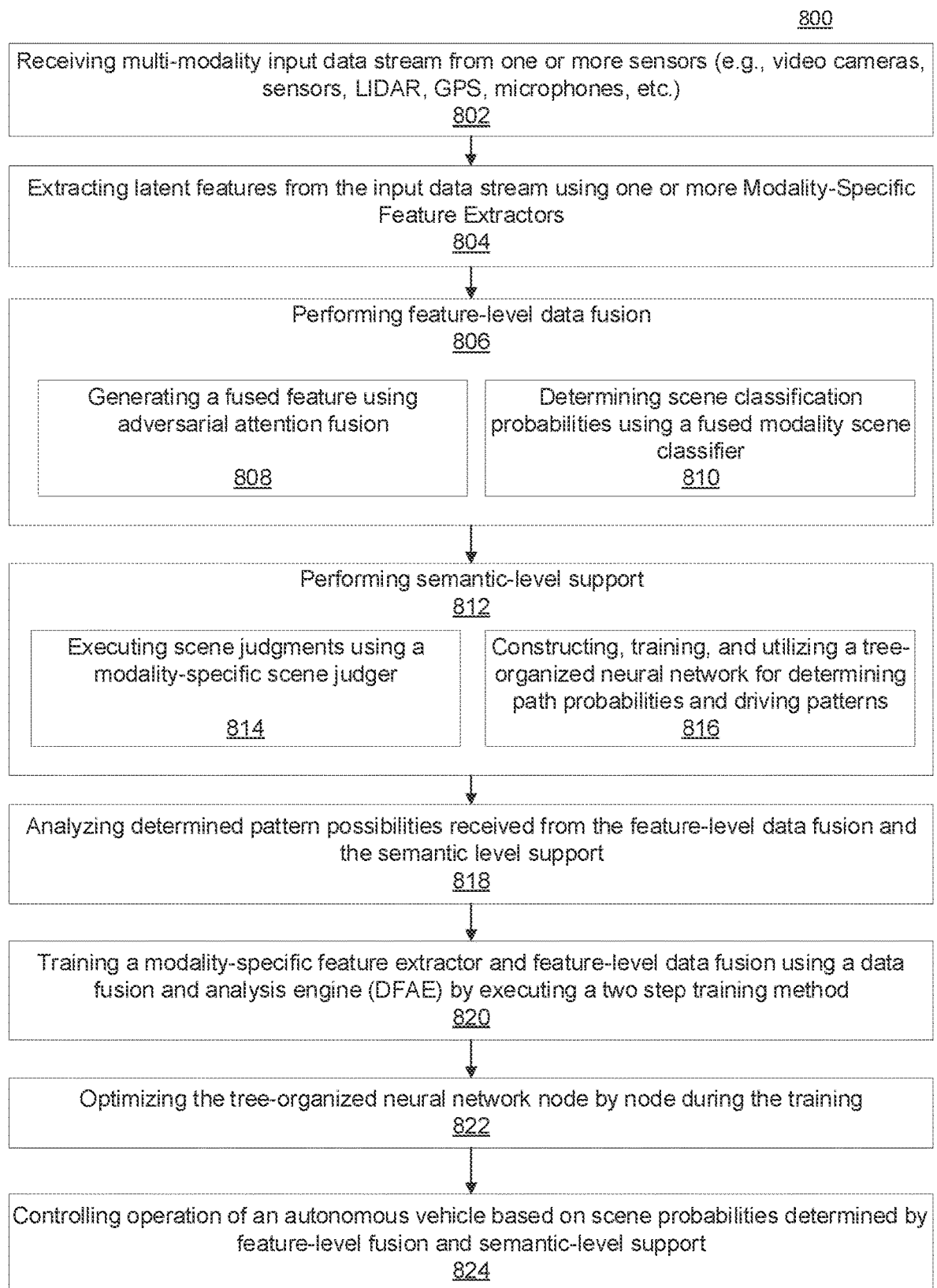
FIG. 8 is a block/flow diagram illustratively depicting a method for data fusion and analysis of a plurality of different types of data from vehicle sensors for autonomous, semi-autonomous, and/or notification-assisted operation of a vehicle, in accordance with embodiments of the present invention.

Referring now to FIG. 8, a method 800 for data fusion and analysis of a plurality of different types of data from vehicle sensors for autonomous, semi-autonomous, and/or notification-assisted operation of a vehicle is illustratively depicted in accordance with embodiments of the present invention.

In one embodiment, a multi-modality input data stream can be received from one or more vehicle sensors (e.g., video cameras, sensors, LIDAR, GPS, microphones, etc.) in block 802. In block 804, latent features can be extracted from the input data stream using one or more Modality-Specific Feature Extractors. Feature level data fusion can be executed in block 806, and can include generating a fused feature using adversarial attention fusion in block 808 and/or determining scene classification probabilities using a fused modality scene classifier in block 810. Semantic-level support can be performed in block 812, and can include executing scene judgments using a Modality-Specific Scene Judger in block 814 and/or constructing, training, and utilizing a tree-organized neural network for determining path probabilities and driving patterns in block 816. In block 818, determined pattern possibilities can be analyzed upon receipt from the feature-level data fusion and the semantic level support, in accordance with aspects of the present invention.

In various embodiments, in block 820, a DFAE learning process can include a two-step training process which can train a modality-specific feature extractor and feature-level data fusion solely based on a mixed loss in a back-propagation way, in accordance with aspects of the present invention. In an embodiment, a min-max problem between the modality-specific feature extractor and discriminator-based regularizer can be utilized to steer feature distribution learning towards the key modality. The corresponding optimization objective for this purpose can be expressed as:

$$\mathcal{L}_{adv} = \min_{\theta_e^v} \max_{\theta_d^v} \sum_{v=2}^{V} \mathbb{E}_{h^1 \sim p_1}[\log D_v(h^1)] + \mathbb{E}_{h^v \sim p_v}[\log(1 - D_v(h^v))]$$

where $h^1 \ldots$ and $h^v$ represents the latent features, $D^v(\ )$ represents a feature distribution function. It can be represented as a layer of neural network nodes and the node weights can be learned and/or adjusted through training. $\mathbb{E}(\ )$ represents a function of expected output of the neural network given the latent features, in accordance with aspects of the present invention.

In some embodiments, to make the metric structures of different modalities reach the mutual agreements, the following loss can be imposed on a fusion module:

$$\mathcal{L}_{fit} = \|K^f - K^c\|_F^2$$

Here, $K^f$ and $K^C$ represent the data metric in latent space:

$$K_{ij}^v = \exp(-\|h_i^v - h_j^v\|^2 / 2\sigma^2)$$

where $K^f$ can be computed based on the fused features with Gaussian kernel and $K^C = \Sigma_v w_v K^v$. An extra effect of the above equation is that the weight can be further considered in metric level, resulting in increased reliability and accuracy of the fused results, in accordance with aspects of the present invention.

In some embodiments, cross-entropy loss $\mathcal{L}_{cro}$ cro can be utilized to measure the classification performance, in accordance with aspects of the present invention. In a first step, the modality-specific feature extractor and feature-level data fusion can be optimized by the $\mathcal{L}_{total}$ as follows:

$$\mathcal{L}_{total} = \mathcal{L}_{cro} + \mathcal{L}_{att} + \mathcal{L}_{adv}$$

In a second step, the training of the tree-organized neural networks can be performed, and the training can rely on data from a pre-trained modality-specific feature extractor. The neural network of each node can be initialized with the parameters of the modality-specific driving pattern classifier, which can be pre-trained before tree-organized neural networks training.

In various embodiments, the neural network of each node can be optimized to minimize the internal cross-entropy loss in a back-propagation way. For example, for node $N_k^j$, the internal cross-entropy can be calculated by:

$$\text{Loss}(N_k^j) = -\sum_{i \in D} \left( y_i^{N_k^j} \log\left(p_i^{N_k^j}\right) + \left(1 - y_i^{N_k^j}\right) \log 1 - p_i^{N_k^j} \right)$$

where $\mathcal{D}$ represents a training set, $y_i^{N_k^j}$ represents the label (0 or 1) in the node $N_k^j$, and it can be the ground-truth whether a sample is in $N_k^j$ and can be a binary label. In this way, the neural network in the tree-structure can be optimized node by node in block 822, in accordance with aspects of the present invention. Operation (e.g., accelerate, brake, turn, etc.) of an autonomous vehicle can be controlled based on the scene probabilities determined by the feature level fusion and semantic level support in block 824, in accordance with aspects of the present invention.

Figure 9:
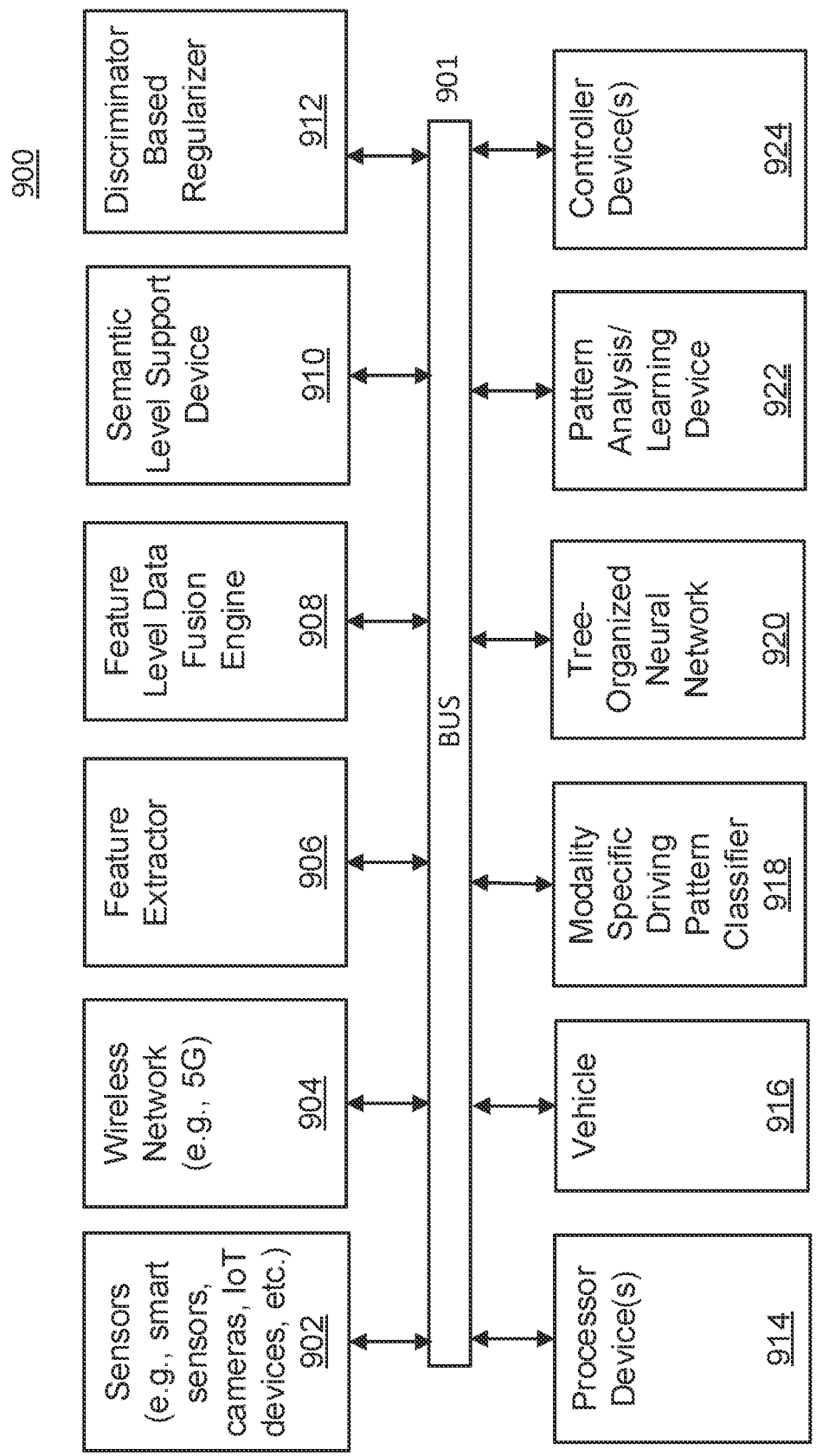
FIG. 9 is a block/flow diagram illustratively depicting a system for data fusion and analysis of a plurality of different types of data from vehicle sensors for autonomous, semi-autonomous, and/or notification-assisted operation of a vehicle, in accordance with embodiments of the present invention.

Referring now to FIG. 9, a system 900 for data fusion and analysis of a plurality of different types of data from vehicle sensors for autonomous, semi-autonomous, and/or notification-assisted operation of a vehicle is illustratively depicted in accordance with embodiments of the present invention.

In some embodiments, one or more sensors 902 (e.g., smart sensors, cameras, IoT devices, etc.) can collect data, and data streams from the sensors 902 can be transmitted over a network 904 (e.g., wireless, CAN bus, LAN, WAN, wired, etc.), and can be analyzed using a processor device 914, which can be deployed on a vehicle 916, in accordance with aspects of the present invention. A feature extractor 906 can extract latent features from data received from the sensors 902, and the latent features can be further processed by a feature level data fusion engine 908 and/or a semantic level support device 910 for further analysis, in accordance with aspects of the present invention.

In various embodiments, features (e.g., latent features) extracted and transmitted from the feature extractor can be regularized using a discriminator based regularizer 912, and a modality specific driving pattern classifier 918 can determine and output driving patterns for further analysis using a tree-organized neural network 920 and/or a pattern analysis learning device 922, in accordance with aspects of the present invention. One or more controller devices 924 can be utilized to adjust any of a plurality of vehicle operations (e.g., accelerate, brake, lighting, etc.) responsive to a determination of a probability of one or more possible driving patterns and/or particular events during operation of a vehicle to improve autonomous navigation of the vehicle, in accordance with aspects of the present invention.

In the embodiment shown in FIG. 9, the elements thereof are interconnected by a bus 901. However, in other embodiments, other types of connections can also be used. Moreover, in an embodiment, at least one of the elements of system 900 is processor-based and/or a logic circuit and can include one or more processor devices 914. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 900 are readily determined by one of ordinary skill in the art, given the teachings of the present principles provided herein, while maintaining the spirit of the present principles.

Figure 10:
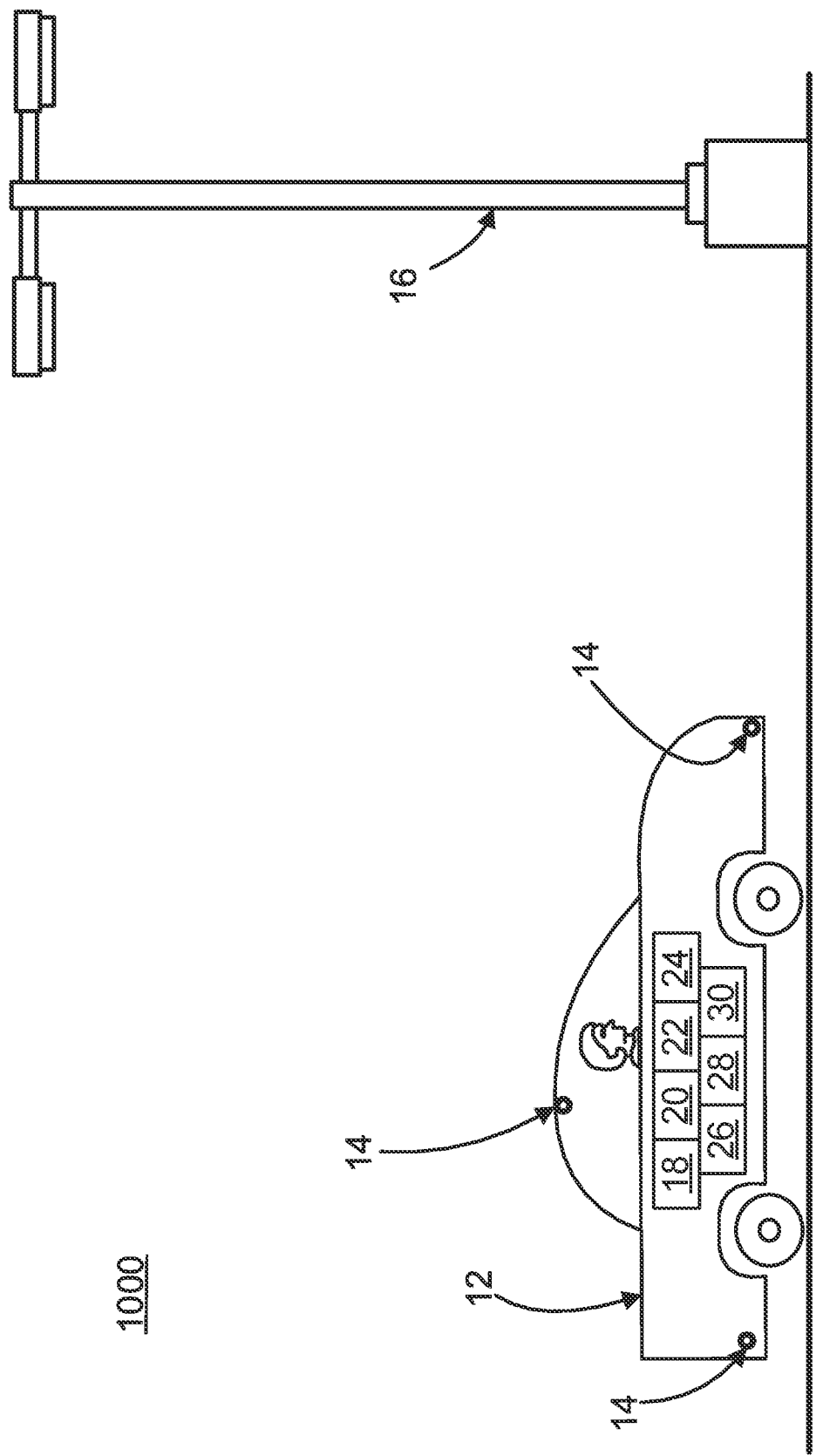
FIG. 10 is an exemplary system illustratively depicting an exemplary vehicle utilizing data fusion and analysis of a plurality of different types of data from vehicle sensors for autonomous, semi-autonomous, and/or notification-assisted operation of a vehicle, in accordance with embodiments of the present invention.

Referring now to FIG. 10, an exemplary system 1000 for an autonomous vehicle utilizing data fusion and analysis of a plurality of different types of data from vehicle sensors for autonomous, semi-autonomous, and/or notification-assisted operation of a vehicle is illustratively depicted in accordance with an embodiment of the present invention. The system 1000 can include an autonomous vehicle 12. In one embodiment, the autonomous vehicle 12 can be an automobile. In other embodiments, the autonomous vehicle 12 can include a boat, plane, helicopter, truck, boat, etc. The autonomous vehicle 12 can include a propulsion system 18. For an airborne embodiment, the propulsion system 18 can include propellers or other engines for flying the autonomous vehicle 12. In another embodiment, the propulsion system 18 can include wheels or tracks. In another embodiment, the propulsion system 18 can include a jet engine or hover technology. The propulsion system 18 can include one or more motors, which can include an internal combustion engine, electric motor, etc.

The autonomous vehicle 12 can include a power source 20. The power source 20 can include or employ one or more batteries, liquid fuel (e.g., gasoline, alcohol, diesel, etc.) or other energy sources. In another embodiment, the power source 20 can include one or more solar cells or one or more fuel cells. In another embodiment, the power source 20 can include combustive gas (e.g., hydrogen).

The autonomous vehicle 12 can be equipped with computing functions and controls. The autonomous vehicle 12 can include a processor 22. The autonomous vehicle 12 can include a transceiver 24. In one embodiment, the transceiver 24 can be coupled to a global position system (GPS) to generate and alert of a position of the autonomous vehicle 12 relative to other vehicles in a common coordinate system. The transceiver 24 can be equipped to communicate with a cellular network system. In this way, the autonomous vehicle's position can be computed based on triangulation between cell towers base upon signal strength or the like. The transceiver 24 can include a WIFI or equivalent radio system. The processor 22, transceiver 24, and location information can be utilized in a guidance control system 26 for the autonomous vehicle 12.

The autonomous vehicle 12 can include memory storage 28. The memory storage 28 can include solid state or soft storage and work in conjunction with other systems on the autonomous vehicle 12 to record data, run algorithms or programs, control the vehicle, etc. The memory storage 28 can include a Read Only Memory (ROM), random access memory (RAM), or any other type of memory useful for the present applications.

The autonomous vehicle 12 can include one or more sensors 14 (e.g., cameras, proximity sensors, LIDAR, radar, GPS, etc.) for collecting data of a plurality of different data types before, during, and/or after utilization of the autonomous vehicle 12. The one or more sensors 14 can view the area surrounding the autonomous vehicle 12 to input sensor data into a Data Fusion and Analysis Engine 30 (DFAE) and the guidance control system 26 of the autonomous vehicle 12. The one or more sensors 14 can detect objects around the autonomous vehicle 12, e.g., other vehicles, building, light poles 16, trees, etc. The data obtained by the one or more sensors 14 can be processed in the DFAE 30 of the autonomous vehicle 12 and can be utilized by the guidance control system 26 to, for example, adjust the propulsion system 18 of the autonomous vehicle 12 to avoid objects around the autonomous vehicle 12, in accordance with various aspects of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for data fusion and analysis of vehicle sensor data, comprising:
   receiving a multiple modality input data stream from a plurality of vehicle sensors;
   determining one or more latent features by extracting one or more modality-specific features from the input data stream;
   aligning a distribution of the latent features of different modalities by feature-level data fusion;
   determining classification probabilities for one or more of the latent features vising a fused modality scene classifier;
   training a tree-organized neural network to determine path probabilities and driving pattern judgments, the tree-organized neural network comprising a soft tree model and a hard decision leaf by measuring a similarity between latent features by an inner product after normalization;
   issuing one or more driving pattern judgments based on a probability of possible driving patterns derived from the one or more modality-specific features to a pattern analyzer to determine a driving pattern output; and
   controlling an operation of an autonomous vehicle based on the driving pattern output.

2. The method as recited in claim 1, wherein the aligning the distribution of the latent features comprises performing adversarial regularization on the distribution of the latent features using a discriminator-based regularizer.

3. The method as recited in claim 1, wherein the fused modality scene classifier comprises two fully connected layers and a softmax layer.

4. The method as recited in claim 1, wherein the tree-organized neural network is configured for filtering patterns that are avoided in reality from the driving pattern judgments.

5. The method as recited in claim 1, wherein each node in the tree-organized neural network is a neural network, and the neural network of the each node is optimized by backpropagation to minimize internal cross-entropy loss.

6. The method as recited in claim 1, wherein the aligning the distribution of the latent features of different modalities comprises regularizing using one or more discriminator-based regularizers, with each of the regularizers comprising three fully connected layers.

7. A system for data fusion and analysis of vehicle sensor data, comprising:
   one or more processors operatively coupled to a non-transitory computer-readable storage medium, the processors being configured for:
      receiving a multiple modality input data stream from a plurality of vehicle sensors;
      determining one or more latent features by extracting one or more modality-specific features from the input data stream;
      aligning a distribution of the latent features of different modalities by feature-level data fusion;
      determining classification probabilities for one or more of the latent features using a fused modality scene classifier;
      training a tree-organized neural network to determine path probabilities and issue driving pattern judgments, the tree-organized neural network comprising a soft tree model and a hard decision leaf by measuring a similarity between latent features by an inner product after normalization;
      issuing one or more driving pattern judgments based on a probability of possible driving patterns derived from the one or more modality-specific features to a pattern analyzer to determine a driving pattern output; and controlling an operation of an autonomous vehicle based on the driving pattern output.

8. The system as recited in claim 7, wherein the aligning the distribution of the latent features comprises performing adversarial regularization on the distribution of the latent features using a discriminator-based regularizer.

9. The system as recited in claim 7, wherein the fused modality scene classifier comprises two fully connected layers and a softmax layer.

10. The system as recited in claim 7, wherein the tree-organized neural network is configured for filtering patterns that are avoided in reality from the driving pattern judgments.

11. The system as recited in claim 7, wherein each node in the tree-organized neural network is a neural network, and the neural network of the each node is optimized by backpropagation to minimize internal cross-entropy loss.

12. The system as recited in claim 7, wherein the aligning the distribution of the latent features of different modalities comprises regularizing using one or more discriminator-based regularizers, with each of the regularizers comprising three fully connected layers.

13. A non-transitory computer readable storage medium comprising a computer readable program operatively coupled to a processor device for data fusion and analysis of vehicle sensor data, wherein the computer readable program when executed on a computer causes the computer to perform the steps of:
receiving a multiple modality input data stream from a plurality of vehicle sensors;
determining one or more latent features by extracting one or more modality-specific features from the input data stream;
aligning a distribution of the latent features of different modalities by feature-level data fusion;
determining classification probabilities for one or more of the latent features using a fused modality scene classifier;
training a tree-organized neural network to determine path probabilities and issue driving pattern judgments, the tree-organized neural network comprising a soft tree model and a hard decision leaf by measuring a similarity between latent features by an inner product after nominalization; and
issuing one or more driving pattern judgments based on a probability of possible driving patterns derived from the one or more modality-specific features to a pattern analyzer to determine a driving pattern output; and
controlling an operation of an autonomous vehicle based on the driving pattern output.

14. The non-transitory computer readable storage medium as recited in claim 13, wherein the aligning the distribution of the latent features comprises performing adversarial regularization on the distribution of the latent features using a discriminator-based regularizer.

15. The non-transitory computer readable storage medium as recited in claim 11, wherein the fused modality scene classifier comprises two fully connected layers and a softmax layer.

16. The non-transitory computer readable storage medium as recited in claim 13, wherein the tree-organized neural network is configured for filtering patterns that are avoided in reality from the driving pattern judgments.

17. The non-transitory computer readable storage medium as recited in claim 13, wherein the aligning the distribution of the latent features of different modalities comprises regularizing using one or more discriminator-based regularizers, with each of the regularizers comprising three fully connected layers.

* * * * *